United States Patent [19]

Griesshammer et al.

[11] 4,454,104

[45] Jun. 12, 1984

[54] PROCESS FOR WORKING UP THE RESIDUAL GASES OBTAINED IN THE DEPOSITION OF SILICON AND IN THE CONVERSION OF SILICON TETRACHLORIDE

[75] Inventors: Rudolf Griesshammer; Franz Köppl, both of Altötting; Helmut Lorenz; Friedrich Steudten, both of Burghausen, all of Fed. Rep. of Germany

[73] Assignee: Wacker-Chemitronic Gesellschaft fur Elektronik-Grundstoffe mbH, Burghausen, Fed. Rep. of Germany

[21] Appl. No.: 404,983

[22] Filed: Aug. 4, 1982

[30] Foreign Application Priority Data

Oct. 6, 1981 [DE] Fed. Rep. of Germany ....... 3139705

[51] Int. Cl.$^3$ ............................................. C01B 33/02
[52] U.S. Cl. ....................................... 423/349; 55/71; 62/32; 423/240
[58] Field of Search .................. 55/40, 23, 71; 62/26, 62/30, 32; 423/348–350, 240

[56] References Cited

U.S. PATENT DOCUMENTS

| | | | |
|---|---|---|---|
| 1,520,627 | 12/1924 | Youker | 55/23 |
| 3,091,517 | 5/1963 | Short et al. | 423/349 |
| 3,286,442 | 11/1966 | Wylegla | 55/23 |
| 3,490,203 | 1/1970 | Kloepfer et al. | 55/71 |
| 3,500,613 | 3/1970 | Kloepfer et al. | 55/71 |
| 4,213,937 | 7/1980 | Padovani et al. | 423/348 |
| 4,340,574 | 7/1982 | Coleman | 423/349 |

*Primary Examiner*—Bernard Nozick
*Attorney, Agent, or Firm*—Collard, Roe & Galgano

[57] ABSTRACT

The chlorosilanes contained in the residual gases obtained in the deposition of silicon and in the conversion of silicon tetrachloride are first condensed out in liquid form. The hydrogen chloride present in the residual gases is dissolved in the condensed silicon tetrachloride. The remaining, virtually pure hydrogen is passed back into the process. During the distillation of the condensate, the dissolved hydrogen chloride is removed and can be separated off and reused. The trichlorosilane obtained after the distillation and the silicon tetrachloride can also be reused in the deposition process or the conversion process, respectively.

10 Claims, 1 Drawing Figure

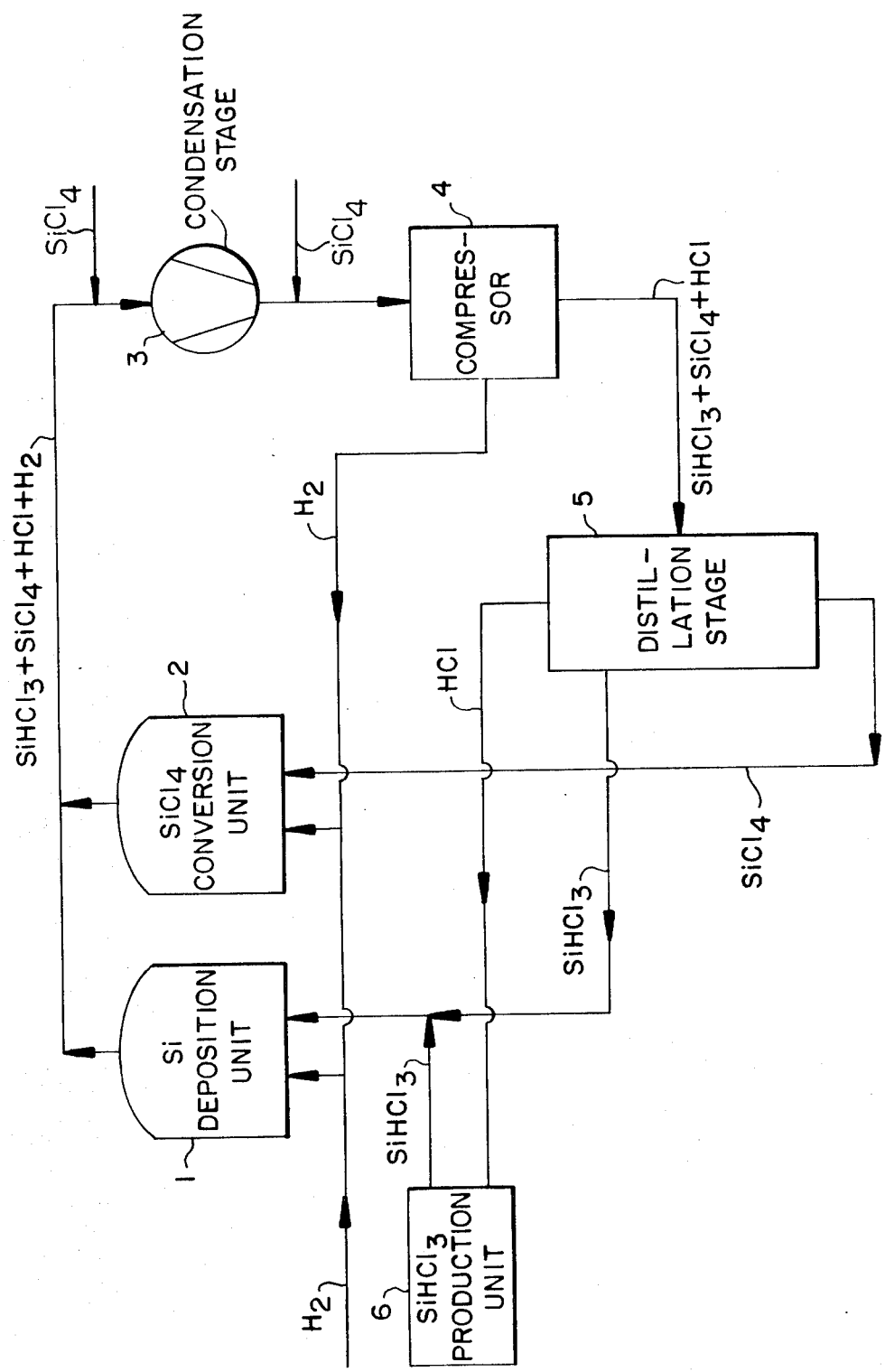

PROCESS FOR WORKING UP THE RESIDUAL GASES OBTAINED IN THE DEPOSITION OF SILICON AND IN THE CONVERSION OF SILICON TETRACHLORIDE

The invention relates to a process for working up the residual gases obtained, in the form of chlorosilanes, hydrogen and hydrogen chloride, in the deposition of silicon by means of the thermal decomposition of a mixture of gases consisting of chlorosilanes and hydrogen on heated supports, and/or in the conversion of silicon tetrachloride.

Hyperpure silicon is preferably obtained by means of the thermal decomposition of chlorosilanes, in particular, trichlorosilane, in the presence of hydrogen. In this process, a mixture of waste gases is formed, which contains, in addition to considerable quantities of unreacted starting materials, also hydrogen, hydrogen chloride and, above all, silicon tetrachloride as a newly formed chlorosilane. Mixtures of waste gases of similar composition are also formed in the conversion of silicon tetrachloride, in which the latter is worked up with hydrogen to give trichlorosilane, which is more favorable for thermal decomposition, and hydrogen chloride.

Whereas in the past, as described, for example, in DE-AS No. 11 85 593, such mixtures of gases were, in general, worked up by means of the hydrolytic decomposition of the silanes, today the aim is to recover, in the undecomposed state, the substances contained in the waste gases, and to employ them again in the deposition or conversion process. In addition to separating off and working up the silanes, that operation also necessitates working up the resulting mixture of hydrogen chloride and hydrogen.

Instead of the absorptive or adsorptive separation of the hydrogen chloride, for example, with the aid of molecular sieves or tetramethylammonium chloride, which is unfavorable because of the risk of impurities, it is also possible, as described in DE-OS No. 29 18 060, first to condense out, in liquid form, the chlorosilanes contained in the mixture of waste gases, and then to freeze the hydrogen chloride out of the residual mixture of gases, in solid form. According to DE-OS No. 29 18 078, it is also possible to freeze out the chlorosilanes and the hydrogen chloride together, in solid form, and then to evaporate the hydrogen chloride therefrom by heating. However, both processes require very low temperatures and, accordingly, expensive cooling and insulating equipment.

The object of the invention was thus to provide a process, which should be as simple as possible from the technical point of view, for working up the residual gases obtained, in the form of chlorosilanes, hydrogen and hydrogen chloride, in the silicon-deposition process and/or in the conversion of silicon tetrachloride.

A surprisingly simple method of achieving this object has now become apparent from the observation that, contrary to the statement in DE-AS No. 11 29 937, according to which hydrogen chloride "is not appreciably soluble in the silanes", and which is quoted in the two last mentioned Offenlegungsschriften, hydrogen chloride is in fact appreciably soluble in tetrachlorosilane. The object of the invention is therefore achieved by means of a process which is characterized in that the chlorosilanes contained in the residual gases are condensed out in liquid form in a known manner, that the hydrogen chloride contained in the residual gases is dissolved in the silicon tetrachloride present in the condensate, and that the hydrogen chloride is removed from that solution again. Virtually pure hydrogen which can be reintroduced into the deposition or conversion process, then remains in the gas phase. The chlorosilanes can also be employed again in those processes once the hydrogen chloride has been removed.

The process according to the invention can be carried out either with the residual gases derived exclusively from the deposition of silicon, or with those derived exclusively from the conversion of silicon tetrachloride, as well as with any desired mixtures of the two, although in principle it is also possible to use gases of corresponding composition derived from other processes.

The particular residual gas or mixture of residual gases to be worked up is, as a rule, first subjected, in a known manner, to a condensation stage by means of cooling, e.g., by means of a brine cooler or Freon cooler or suitable electrical cooling units, in order to cause the chlorosilanes contained therein to precipitate. The cooling temperature selected is advantageously such that the condensate is obtained in liquid form and the freezing-out of any component is avoided. The temperature should therefore always be above the melting point of the chlorosilane which freezes out first, in solid form, and therefore, as a rule, above the melting point of silicon tetrachloride. Since the solubility of hydrogen chloride in silicon tetrachloride increases as the temperature decreases, in general, as low a cooling temperature as possible, namely about $-60°$ C., is aimed at, although good results can also be achieved with, for example, brine cooling at about $-16°$ C.

Greater solubility of the hydrogen chloride in condensed silicon tetrachloride can also be achieved by increasing the pressure of the residual gases to be worked up, for which purpose apparatus customary in industry, such as, for example, screw-type compressors, in suitable; a pressure in the region of about 8 bar has hitherto proved to be very suitable. A further increase in the pressure, for example, up to 10 bar, is possible in principle; however, for reasons of safety, the pressure cannot, as a rule, be increased to an unlimited extent.

If the proportion of silicon tetrachloride in the mixture of residual gases is insufficient to dissolve all the hydrogen chloride obtained, an appropriate amount of silicon tetrachloride can additionally be fed into the system. The silicon tetrachloride can be added either in liquid form, e.g., to the condensate, or in gas form, e.g., by being mixed with the residual gases to be condensed.

The condensate in which the chlorosilanes, contained in the residual gases, and the dissolved hydrogen chloride are obtained is advantageously worked up by means of distillation. In addition to separating silicon tetrachloride and trichlorosilane as completely as possible, it is important here that the process should be carried out in such a manner that the dissolved hydrogen chloride can be removed virtually completely from its solvent and thus be available for reuse. Since the only impurities contained in the resulting hydrogen chloride are silanes, the hydrogen chloride can be employed again particularly favorably, e.g., in the production of trichlorosilane from FeSi. The chlorosilanes obtained by means of distillation are preferably returned to the process again. For example, the trichlorosilane is preferably returned to the silicon deposition operation, while the silicon tetrachloride is primarily subjected to conversion to trichlorosilane.

The manner in which the process according to the invention is carried out is explained below, by way of example, using the diagram illustrated in the drawing. In the drawing, a schematic diagram illustrating the process cycle is shown.

Referring now in detail to the drawing, the residual gases derived from the silicon deposition unit 1 and the silicon tetrachloride conversion unit 2 are condensed in the condensation stage 3. The hydrogen remaining in the gas phase is readjusted to a suitable pressure by means of a compressor 4 and is reintroduced into the deposition or conversion process. The condensate, which consists of trichlorosilane, silicon tetrachloride and, dissolved therein, hydrogen chloride, passes to a distillation stage 5, where trichlorosilane and silicon tetrachloride are separated from one another. During this operation, the hydrogen chloride dissolved in the silicon tetrachloride is removed and can be taken off at a suitable point and reused, e.g., in the production of trichlorosilane 6. The two chlorosilanes which have been separated from one another are again mixed with the corresponding reaction gases in a deposition or conversion process. The process according to the invention thus makes it possible to work up the residual gases obtained in the deposition of silicon or the conversion of silicon tetrachloride and to reintroduce them into those processes at a suitable point without great technical outlay.

In the following, the invention will be more fully described in a number of examples, which are given by way of illustration and not of limitation.

EXAMPLE 50 m$^3$/h of waste gas resulting from the conversion of silicon tetrachloride and having a composition of 45% by volume of hydrogen, 5% by volume of trichlorosilane, 45% by volume of silicon tetrachloride and 5% by volume of hydrogen chloride were combined with 100 m$^3$/h of waste gas resulting from the deposition of silicon and having a composition of 60% by volume of hydrogen, 25% by volume of trichlorosilane, 13% by volume of silicon tetrachloride and 2% by volume of hydrogen chloride. The combination of waste gases was compressed from 2 bar to 8 bar in a screw-type compressor and then passed through a cooler operated at $-60°$ C. The composition of the gas entering the cooler, i.e., the composition of the mixture of the two above-mentioned waste gases, was 55% by volume of hydrogen and 18% by volume of hydrogen chloride. 163 kg/h of trichlorosilane, 273 kg/h of silicon tetrachloride and, dissolved therein, 7 kg/h of hydrogen chloride condensed in the cooler. This condensate was passed to a separating column and separated therein, by means of distillation, into trichlorosilane and silicon tetrachloride. During this process, the dissolved hydrogen chloride was removed and could be taken off at the top of the colummn and reused for the production of trichlorosilane. The silicon tetrachloride and trichlorosilane obtained in the distillation could be used again, without further purification, in the conversion of silicon tetrachloride and the deposition of silicon, respectively. The gas issuing from the cooler (83 m$^3$/h) consisted of 99.69% by volume of hydrogen, 0.03% by volume of trichlorosilane, 0.08% by volume of silicon tetrachloride and 0.2% by volume of hydrogen chloride, and it was returned to the two processes of silicon tetrachloride conversion and silicon deposition.

Thus, while only several examples of the present invention have been shown and described, it will be obvious that many changes and modifications may be made thereunto, without departing from the spirit and scope of the invention.

What is claimed is:

1. A process for working up residual waste gases containing chlorosilanes, silicon tetrachloride, hydrogen and hydrogen chloride, comprising the steps of:
    condensing out in liquid form silicon tetrachloride, hydrogen chloride and the chlorosilanes contained in said residual gases so as to produce a condensate containing chlorosilanes, silicon tetrachloride and hydrogen chloride dissolved in said silicon tetrachloride; and
    collecting said hydrogen chloride dissolved in said silicon tetrachloride and removing said hydrogen choride from said silicon tetrachloride.

2. The process of claim 1, additionally including the step of feeding tetrachlorosilane in liquid form to said condensate formed by said condensing step in order to improve the dissolution of the hydrogen chloride.

3. The process of claim 1, additionally including the preliminary step of obtaining said residual waste gases from a silicon deposition process involving the thermal decomposition of a mixture of gases comprising chlorosilanes and hydrogen on heated supports.

4. The process of claim 1, additionally including the preliminary step of obtaining said residual waste gases from a process involving the conversion of silicon tetrachloride.

5. The process of claim 1, wherein said chlorosilanes are condensed at a temperature above the melting point of tetrachlorosilane.

6. The process of claim 5, wherein said temperature falls within the range between about $-60°$ C. and about $-16°$ C.

7. The process of claim 1, additionally including the step of keeping said residual gases under elevated pressure, so as to increase the solubility of the hydrogen chloride in silicon tetrachloride.

8. The process of claim 7, wherein said residual gases are kept under a pressure of up to 10 bar.

9. The process of claim 1, wherein said step of removing hydrogen chloride comprises working up said condensate by means of distillation.

10. The process of claim 1 or 9, additionally including the step of feeding tetrachlorosilane in gas form into said residual gases prior to said condensing step in order to improve the dissolution of the hydrogen chloride in said subsequent condensing step.

* * * * *